(12) United States Patent
Burnison et al.

(10) Patent No.: US 8,941,510 B2
(45) Date of Patent: Jan. 27, 2015

(54) HAZARD WARNING SYSTEM FOR VEHICLES

(75) Inventors: Chantal Burnison, Los Angeles, CA (US); Philippe Bensoussan, Vienne (FR)

(73) Assignee: BCS Business Consulting Services Pte Ltd, Faber House (SG)

( * ) Notice: Subject to any disclaimer, the term of this patent is extended or adjusted under 35 U.S.C. 154(b) by 25 days.

(21) Appl. No.: 13/883,512

(22) PCT Filed: Oct. 30, 2011

(86) PCT No.: PCT/US2011/001837
§ 371 (c)(1),
(2), (4) Date: May 3, 2013

(87) PCT Pub. No.: WO2012/071054
PCT Pub. Date: May 31, 2012

(65) Prior Publication Data
US 2013/0229289 A1    Sep. 5, 2013

Related U.S. Application Data

(63) Continuation-in-part of application No. 12/927,841, filed on Nov. 24, 2010, now Pat. No. 8,552,886.

(51) Int. Cl.
*G08G 1/00* (2006.01)
*G08G 1/16* (2006.01)
(Continued)

(52) U.S. Cl.
CPC  *B60Q 1/52* (2013.01); *B60Q 5/006* (2013.01); *G08G 1/162* (2013.01); *G08G 1/096741* (2013.01); *G08G 1/096791* (2013.01); *G08G 1/205* (2013.01)
USPC ........ 340/902; 340/905; 340/425.5; 340/436; 701/301

(58) Field of Classification Search
USPC ......... 340/901, 902, 903, 905, 425.5, 426.16, 340/436, 438, 463; 701/9, 300, 301, 1
See application file for complete search history.

(56) References Cited

U.S. PATENT DOCUMENTS 3,997,868 A    12/1976 Ribnick
5,699,056 A *  12/1997 Yoshida ........................ 340/905
(Continued)

FOREIGN PATENT DOCUMENTS

EP    1149371    5/2007
GB    2440666    2/2008
(Continued)

OTHER PUBLICATIONS

International Search Report; PCT/US2011/001837 dated Jun. 1, 2012.
(Continued)

*Primary Examiner* — Hung T Nguyen
(74) *Attorney, Agent, or Firm* — TraskBritt, P.C.

(57) ABSTRACT

A system adapted to provide a warning to a vehicle operator of nearby hazards, e.g., that a nearby vehicle has been in a collision or is otherwise inoperable. Embodiments include a detector operable to detect a hazard, a transmitter to transmit a warning signal, a receiver to receive a transmitted warning signal, and a display to warn the operator of an approaching vehicle of the hazard. Some embodiments incorporate feedback from a vehicle's airbag deployment circuitry to provide a trigger effective to broadcast the warning signal. The operator of an approaching vehicle may be provided with a visual and/or an audible warning signal, e.g., via a cellular telephone. Certain embodiments provide such warning to approaching vehicles via the transmitted warning signal and a display and/or speaker carried in the approaching vehicle. Audible and visual warnings may be transmitted directly from the crashed vehicle.

26 Claims, 3 Drawing Sheets

(51) Int. Cl.
*B60Q 1/52* (2006.01)
*B60Q 5/00* (2006.01)
*G08G 1/0967* (2006.01)

(56) References Cited

U.S. PATENT DOCUMENTS

| | | | |
|---|---|---|---|
| 5,734,320 | A | 3/1998 | Suzuki |
| 6,081,188 | A | 6/2000 | Kutlucinar et al. |
| 6,615,137 | B2 | 9/2003 | Lutter et al. |
| 7,289,019 | B1 * | 10/2007 | Kertes ............... 340/435 |
| 7,523,000 | B2 | 4/2009 | Tengler et al. |
| 7,796,020 | B2 | 9/2010 | Suzuki |
| 7,991,551 | B2 * | 8/2011 | Samuel et al. ........... 701/301 |
| 8,593,300 | B2 | 11/2013 | Ooshima et al. |
| 2007/0063824 | A1 | 3/2007 | Gaddy et al. |
| 2008/0055068 | A1 | 3/2008 | Van Wageningen et al. |
| 2008/0275618 | A1 | 11/2008 | Grimm et al. |
| 2009/0189754 | A1 | 7/2009 | Hochrein |
| 2010/0020169 | A1 | 1/2010 | Jang et al. |
| 2010/0114418 | A1 | 5/2010 | Samuel et al. |
| 2010/0114467 | A1 | 5/2010 | Samuel et al. |
| 2010/0134271 | A1 | 6/2010 | Edwards et al. |
| 2012/0126997 | A1 | 5/2012 | Bensoussan |

FOREIGN PATENT DOCUMENTS

| | | |
|---|---|---|
| WO | 2009140514 | 11/2009 |
| WO | 2010055509 | 5/2010 |
| WO | 2012071054 | 5/2012 |

OTHER PUBLICATIONS

EPO Form 1703; 7 pages; dated Apr. 3, 2014.
Supplemental European Search Report; EP11843441; dated Apr. 3, 2014; 2 pgs.
Bohannon, John; A Shake May Prevent a Crash; Science Now; May 26, 2009; 2 pgs.
Brandon, John; Car tech: Building the zero-fatality car; Computerworld; Aug. 5, 2010; 10 pgs.
NZ Transport Agency; Features that prevent crashes; Dec. 1, 2009; 4 pgs.
Crash warning for connected cars?; RElative POSitioning for collision avoidance systems (REPOSIT); Jan. 1, 2006-Jun. 30, 2007; 2 pgs.

* cited by examiner

HAZARD WARNING SYSTEM FOR VEHICLES

CROSS-REFERENCE TO RELATED APPLICATIONS

This application is a national phase entry under 35 U.S.C. §371 of International Patent Application PCT/US2011/001837, filed Oct. 31, 2011, designating the United States of America and published in English as International patent Publication WO 2012/071054 on Jul. 26, 2012, which is a continuation-in-part of U.S. patent application Ser. No. 12/927,841, filed Nov. 24, 2010, now U.S. Pat. No. 8,552,886, issued Oct. 8, 2013, for "Crash Warning System for Motor Vehicles," the disclosure of each of which is hereby incorporated herein by this reference in its entirety.

TECHNICAL FIELD

The invention relates to warning devices. Preferred embodiments are adapted to detect occurrence of a hazard, such as a collision involving a vehicle, and then immediately broadcast a warning of such hazard to vehicle operators in the vicinity of the hazard.

BACKGROUND

A number of patents and patent application publications disclose structure and technology related to warning devices and systems that can be employed in a mobile environment. Each or the patents and publications referenced herein is hereby incorporated by reference in its entirety. U.S. Pat. No. 7,523,000, dated Apr. 21, 2009, describes a system of communication among cars, stationary towers, and satellites. When a rear-end collision is predicted, the system accelerates the vehicle in front to avoid the collision.

U.S. Patent Application Publication US 2008/0055068 A1, dated Mar. 6, 2008, describes broadcasting warning messages among mobile nodes at optimal power levels to avoid network overload. A communication device senses a danger and triggers a warning message to be forwarded to neighboring vehicles. Received messages may be retransmitted to other vehicles. U.S. Patent Application Publication US 2010/0134271 A1, dated Jun. 3, 2010, describes a visual warning system from one car to another. A driver who sees a hazard can press a button. An indicator will then illuminate; other drivers who see the indicator will then know of the hazard, and can plan accordingly. The warning may also be transmitted wirelessly; drivers who have similarly equipped cars may receive an in-car warning even when they cannot see the other car's indicator.

U.S. Patent Application Publication US 2010/0114467 A1, dated May 6, 2010, describes a vehicle with sensors to determine when nearby vehicles have crashed, by determining that their speeds have fallen outside of normal ranges. This information may then be transmitted to other vehicles by vehicle-to-vehicle communications or by flashing lights. U.S. Patent Application Publication US 2010/0114418 A1, dated May 6, 2010, describes a vehicle with sensors to determine when nearby vehicles have crashed, by determining their movement outside of normal traffic lanes. This information may then be transmitted to other vehicles by vehicle-to-vehicle communications or by flashing lights.

U.S. Patent Application Publication US 2010/0020169 A1, dated Jan. 28, 2010, describes a system that communicates with other vehicles. When a collision is predicted based on speed data from other vehicles, the system directs the driver where to go (e.g., change lanes) to avoid collision. U.S. Patent Application Publication US 2007/0063824 A1, dated Mar. 22, 2007, describes a system that can receive data from road construction transmitters, emergency vehicle transmitters, or other vehicles concerning road hazards. The system can also repeat signals to other vehicles. U.S. Patent Application Publication US 2008/0275618 A1, dated Nov. 6, 2008, describes an alert system to warn drivers when vehicles ahead are moving more slowly than normal. The vehicles transmit their speed data to each other, and large speed discrepancies generate warnings to drivers. Other conditions may also be transmitted, such as hazard signal state (on or off) or trunk or door position (open or closed).

EP 1 149 371 B1, published Oct. 31, 2001, describes a system of changing speed limits and speed bump size remotely and reporting collision information to first responders, traffic enforcement, etc. Communication is from a fixed point on or near a road to police, then to specific mobile officials as necessary.

International Publication WO 2009/140514 A2, dated Nov. 19, 2009, describes a fleet of vehicles communicating with one another. Follower vehicles operate autonomously based on data from the leader vehicle. International Publication WO 2010/055509 A1, dated May 20, 2010, describes a vehicle subsystem that collects information about the state of the vehicle. Information is communicated with a remote central server, which also transmits hazard information back to the vehicle and to other vehicles.

A number of articles and publications also describe relevant structure and technology. The article titled "A Shake May Prevent a Crash," Science Now, news.sciencemag.org/sciencenow/2009/05/26-02.html, May 26, 2009, describes using radar or lasers to detect impending collisions, then warning drivers via tactile warnings. The article titled "Car tech: Building the zero-fatality car," Computerworld, worldwideweb.computerworld.com/s/article/print/9179697/Car_tech_$_{Building}$_the_zero_fatality_car, Aug. 5, 2010, describes sending out a "safety state—for example, the car's speed, the level of brake pressure the driver has applied and steering—to every other car in the vicinity." Similarly, the article "Crash Warning for Connected Cars?," ICT Results, worldwideweb.ec.europa.eu/information_society/activities/policy_link/documents/ict_results_factsheets/reposit.pdf, describes connected cars sharing their position, speed, and trajectory. A car receiving such data can then calculate the vehicles' relative positions to predict collisions. The publication "Features that prevent crashes," NZ Transport Agency, 210.48.109.8/vehicle/choosing/features-prevent.html, Dec. 1, 2009, describes collision warning and avoidance systems that depend on a supporting network within the road system.

DISCLOSURE

As used herein, the term "collision" means and includes a contact between a vehicle and another object, including another vehicle, a fixed object (e.g., a guardrail, a building, a tree, etc.), a human, an animal, cargo, debris, the ground, etc. Collisions include impacts among vehicles caused by accidental and purposeful acts (e.g., a law-enforcement officer's ramming of a fleeing suspect's vehicle to disable the suspect's vehicle). Collisions also include impacts between the ground and any part of the vehicle other than its wheels. Collisions may be referred to in the art as "accidents," "wrecks," "crashes," "impacts," "fender-benders," "pileups," etc.

As used here, the term "hazard" means and includes a source of danger, such as a risk of collision. Hazards include, for example, collisions, animals, debris, work crews, pedestrians, and even other vehicles.

The invention may be embodied as a hazard warning system adapted to give vehicle operators an advance warning of a hazard, such as that a nearby vehicle has been in a collision. An exemplary such warning system includes a first detector structured to be carried onboard a first vehicle. Broadly, a workable detector is adapted to detect a collision involving the first vehicle and to consequently cause a first output. The detector may operate automatically without any input from the vehicle's operator.

A detector may include a collision-detecting component of the first vehicle's airbag deployment controls. A first detector may be disposed in-circuit to receive an input from a component of airbag deployment circuitry of the first vehicle. In such case, deployment of a vehicle's air bag may also generate a signal indicating that a collision has occurred involving the vehicle. In some embodiments, a detector may be configured to independently detect that an airbag has deployed (i.e., independent of the airbag's circuitry). For example, a sensor may be configured to detect heat and/or pressure associated with an expanding airbag. One or more detectors may be arranged to detect a collision that occurs from any point of the compass, including from the front, side, or rear of a vehicle. For example, the detector may include one or more accelerometers.

The exemplary system also includes a first transmitter disposed in communication with the first detector and operable to broadcast a first remote warning signal subsequent to receiving the detector's first output. If the first vehicle experiences a sufficiently significant collision, the first remote warning signal is broadcast for reception by compatible hazard warning systems carried in nearby vehicles. The first remote warning signal may be transmitted from one vehicle directly to other vehicles, without passing through any intermediary. In some embodiments, the first remote warning signal may be transmitted to other vehicles via repeaters or amplifiers, such as repeaters mounted in satellites or in terrestrial infrastructure (e.g., towers, underpasses, buildings, etc.). One advantage of automatic, direct vehicle-to-vehicle communication is that warnings may be more immediate, and may be more effective at preventing additional collisions than conventional methods of warning of hazards. Furthermore, systems configured to communicate directly with other systems may be deployed without modifying infrastructure. Another benefit of the hazard warning systems disclosed herein is that warnings may be transmitted around curves or over hills, and may provide vehicle operators information regarding hazards beyond their immediate vision (which, when traveling at high speeds, may be a distance traveled in a relatively short period of time).

One determination of a sufficient level of significance is defined as a collision wherein an air bag is deployed. However, some hazards may not cause deployed airbags, but may nonetheless warrant broadcasting a remote warning signal, such as side-impact collisions, rear-end collisions, overturned vehicles, stalled vehicles, debris, etc.

A first exemplary remote warning transmitter may be embodied as a warning light structured to be carried onboard the first vehicle and adapted to broadcast a warning light output responsive to an output of the first detector. A warning light may be configured to be visible to an occupant of an approaching vehicle. One such warning light is adapted to be carried on top of the roof of the first vehicle. In some embodiments, a warning light may include one or more element selected from the group including a brake light, a turn signal light, a taillight, a running light, a fog light, and a headlight of the first vehicle.

A second exemplary remote warning transmitter may be embodied as an alarm structured to be carried onboard the first vehicle and adapted to broadcast an audible warning, for perception of the audible warning by an occupant of an approaching vehicle. An alarm may include, e.g., a loud speaker and/or a siren.

A third exemplary remote warning transmitter may be embodied as a broadcasting device, such as a radio frequency or radar transmitter. In general, a remote warning transmitter may be configured to convey warning information from a hazard site to a remote site. Preferably, a remote warning transmitter is operably responsive to an actuating output of an associated detector. One or more remote warning signals may be substantially simultaneously broadcast from various hazard warning systems (e.g., from different vehicles).

The exemplary system also includes a first receiver structured to be carried onboard the first vehicle and operable to receive a second remote warning signal that is transmitted by a different hazard warning system carried by a nearby vehicle. The exemplary system further includes a first local warning device in communication with the first receiver and effective to communicate a warning to an occupant disposed inside the first vehicle. The exemplary system is structured such that a remote warning signal from a different hazard warning system causes a local warning, perceptible to an occupant of the first vehicle, to be conveyed by the first local warning device. By extrapolation, a remote warning signal broadcast from a remote hazard site may cause a plurality of local warnings to alert operators of nearby vehicles of the remote hazard.

An exemplary first local warning device includes a display screen on which a printed message may be displayed for observation by an operator of the first vehicle. Display screens may include light emitting diodes ("LED"), liquid crystal displays ("LCD"), cathode ray tube ("CRT") devices, and the like. Desirably, the text message is presented in a format to draw the attention of the vehicle operator, such as in a highly visible color. Sometimes, a first local warning device is structured to visually convey the instantaneous intensity, selected from a range of intensities, of an attribute associated with a second signal. One exemplary local warning device is structured to determine and visually convey an approximate current state of intensity, selected from a plurality of different states of intensity, of an attribute associated with a received signal. For example, a distance between an approaching vehicle and a hazard site may be represented by a plurality of lights, a bar chart, or a picture of an analog dial and needle. In some embodiments, a first local warning device may include analog instruments. In certain cases, a plurality of audible sounds may be individually assigned to each one of the plurality of states of intensity, and a speaker may be associated with the warning device to broadcast one sound, selected from the sounds and corresponding to the currently determined state, for audible perception of the one sound by an occupant of the first vehicle.

A hazard warning system may include an override control or reset button, operable to terminate broadcast of one or more signal or to adjust an output of the warning system. In an exemplary case, the override control is structured to be operable only after a first pre-programmed period of time has elapsed subsequent to first broadcast of a signal. Also, the transmission range for a transmitted remote warning signal may be adjustable based upon conditions disposed in the location of a hazard. A first transmitter carried in a nearby vehicle may be disposed, in-circuit, operably to rebroadcast a remote warning signal received from a crashed vehicle to extend the distance a signal is transmitted from a hazard site. In some embodiments, a first transmitter may rebroadcast a remote warning signal only after prompting a vehicle operator for approval to rebroadcast. In other embodiments, the remote warning signal may be rebroadcast automatically.

The exemplary system may be adapted for use in cooperation with at least a second hazard warning system. The second warning system is structured to be carried by a second vehicle to detect a collision involving the second vehicle and, consequently, broadcast a remote warning signal to warn occupants of nearby vehicles, such as the first vehicle. A plurality of hazard warning systems may be carried in a corresponding plurality of different vehicles. Desirably, such plurality of hazard warning systems are at least compatibly arranged to broadcast and receive mutually compatible remote warning signals. As more and more vehicles include hazard warning systems, the value or benefit of individual hazard warning systems may increase (i.e., hazard warning systems may have a demand-side economy of scale). In a best-case situation, every vehicle on the road would include a hazard warning system able both to communicate a remote warning to nearby vehicles, and operably receive such a remote warning. Consequently, a broadcast remote warning signal would provide a local warning to each nearby vehicle in range to receive the remote warning signal.

The currently preferred hazard warning system includes a detector, a transmitter, a receiver, and a local warning device. Such a system may be encompassed within one or more independent modules that can be carried by a vehicle. Part of, or the entirety of, a hazard warning system may be built-in to a vehicle, or connected to one or more component of the vehicle.

In general, a detector is any device operable to generate an input signal resulting from a collision involving a vehicle in which the collision detector is carried or upon activation by an operator. The detector may detect a collision as the collision occurs, or within a short period of time thereafter. A controller may be disposed in-circuit to evaluate the significance of a collision before actuating a transmitter. Desirably, the collision is first evaluated and determined to be above a certain threshold before the collision warning system is actuated. A currently preferred collision detector includes a component of an airbag deployment control assembly of the vehicle. In such case, the detector can be structured to cause an input signal to a controller or an actuation signal to a transmitter, responsive to a trigger caused by airbag deployment resulting from the collision.

The transmitter is disposed in communication with the detector. In general, an operable transmitter can broadcast a remote warning signal directed to nearby traffic. Certain remote warning signals include signals that are directly perceptible to humans, such as sounds and lights. A sound signal may be broadcast by an alarm, such as a loudspeaker or siren. A workable light signal may be cast from a dedicated warning light. A warning light may be carried on the roof of the vehicle, enabling observation of broadcast light from all points of the compass. Certain warning light arrangements may include a headlight, turn signal light, taillight, running light, fog light, or brake light as a broadcasting device. Another remote warning signal includes a signal that can be broadcast from a crashed vehicle for reception by a receiver and subsequent input to a local warning device carried in one or more nearby vehicles. Exemplary broadcastable signals include electromagnetic radiation (e.g., infrared), radar, and radio frequency signals.

The receiver is structured to receive a remote warning signal from a different warning system. A local display device in communication with the receiver is effective to communicate a local warning, corresponding to the remote warning signal, to an occupant of the vehicle. A display device may be structured to visually convey an intensity of a parameter, such as an estimate of the distance to a hazard site. A plurality of audible noises may be individually assigned to a corresponding plurality of discrete parameter values. In such case, a speaker may be employed to broadcast the noise corresponding to the currently displayed parameter value.

MODE(S) FOR CARRYING OUT THE INVENTION

Provided is an apparatus (or "system") adapted to warn vehicle operators (e.g., motorists) that a hazard (e.g., a collision involving another vehicle) is in the vicinity. Embodiments thereof may be structured in modular form for convenient aftermarket installation in a vehicle, or as an Original Equipment Manufactured (OEM) component or system.

Figure 1:
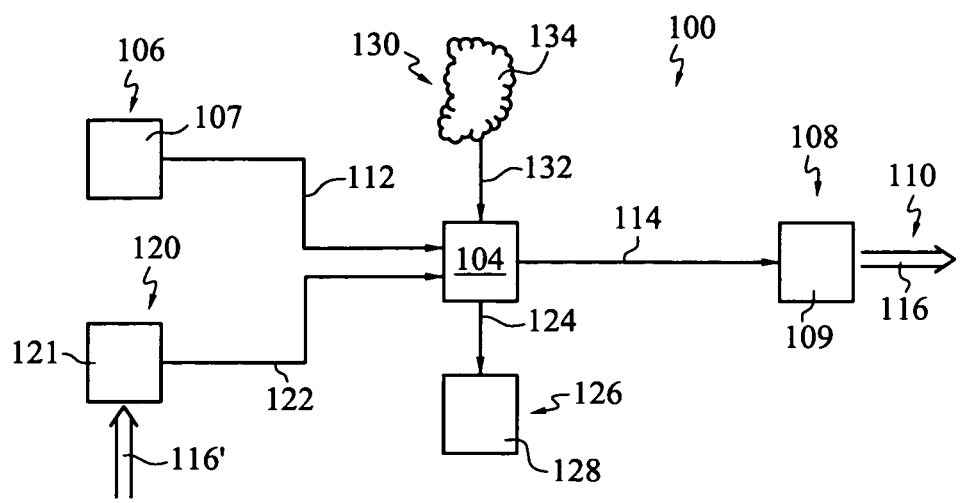
FIG. 1 is a simplified schematic view representing elements of an assembly constructed according to certain principles of the instant disclosure.

An embodiment adapted to be carried by a vehicle is indicated generally at 100 in FIG. 1 and includes a controller 104 in communication with a detector, generally indicated at 106 and a remote signal transmitter, generally indicated at 108. A remote signal transmitter 108 may be capable of broadcasting a remote warning signal 110 to provide a warning to operators of other vehicles in the vicinity of a detected hazard. Remote warning signals 110 may include visible, audible, and other transmittable signals, such as radar, electromagnetic (e.g., infrared, ultraviolet, etc.), and radio frequency (RF) signals. The remote signal transmitter 108 may be a low-power radio frequency transmitter 109. As one example, a remote signal transmitter 108 may operate under the open-source Class 1 Bluetooth protocol, which has a maximum permitted power of 100 mW and a range of about 100 meters.

A detector 106 may pass an informational signal to a controller 104 in response to a hazard or collision (e.g., as the collision occurs or shortly thereafter). A detector 106 may incorporate one or more sensor components already present in a significant number of automotive vehicles. The detector may include a collision-detecting element 107, such as may be used in a vehicle's airbag deployment system.

Several types of collision-detecting sensors exist in commercial use in airbag deployment systems. Commercially available collision-detecting sensors include electrical systems, mechanical systems, and combinations of mechanical and electrical systems of operation. For example, some vehicles have "spring and mass" collision-detecting sensors in which a spring-loaded weight is deflected by an impact to close a switch. Some newer vehicles have solid-state collision-detecting sensors that contain either a piezoelectric crystal or a micromachined accelerometer chip, and that produce an electrical signal when sufficiently jolted. Sensors that close switches, open switches, or generate an electric signal responsive to a collision may easily be adapted to provide an informational signal to a controller that a collision has occurred.

Certain vehicles include self-contained mechanical air bag systems that trip a firing pin when jostled by a collision. The firing pin typically ignites a primer to fire a propellant used to inflate the airbag. Even a sensor of the mechanical type may be configured as a detector 106 to produce an electrically based informational output signal 112 or 114 responsive the deployment of an element such as: the firing pin configured also to function as an electrical switch; a temperature sensor disposed to measure a temperature of a propellant; a pressure sensor inside an air bag; or the like. In any event, a signal may be obtained from a variety of sensor element types for use as either an informational input 112 to a controller, or as a direct command input 114 to a remote signal transmitter 108. Put another way, a detector 106 may be characterized as causing an output, such as signal 112 or signal 114, to cause a transmitter, such as transmitter 108, to broadcast a remote warning signal.

One common airbag impact or collision-detecting sensor employs a ball confined inside an upwardly slanting tube having an electrical contact disposed at the elevated end of the slanted tube. A small magnet exerts a restraining force on the ball at the bottom of the incline, which restraining force must be overcome by the deceleration effected by a collision. When a collision having a magnitude large enough to cause sufficient deceleration occurs, the ball rolls up the incline to make contact with, and close, the electric switch. Gas damping may be incorporated to provide further resistance to the ball's rolling up the incline. The ball typically rolls back to the bottom of the sloping tube subsequent to the collision, resetting the sensor. In such a sensor, an informational signal 112 or command signal 114 may be obtained indicating departure of the ball from its normally trapped position to the extent that the collision-detection switch is closed. When that switch is closed, a resulting electrical signal may be obtained: and used, for example, as an informational signal 112 in a hazard warning system 100.

Another common collision sensor is the "Rolamite" design by TRW, which includes a small metal roller that rolls forward under sudden deceleration to trip a switch. Such sensors may provide an electrical informational signal 112 when the tripped switch is closed, or sometimes even when a different switch is opened, i.e., indicating the roller element is away from its normally occupied position.

In many cases, a safety sensor arming sensor is incorporated into an airbag control module of an airbag deployment system to reduce false airbag deployment (e.g., due to a slow-speed collision). Such safety sensor may be located at a different position, typically in the passenger compartment and farther away from the likely impact site, than the collision-detecting sensor. The airbag control module essentially requires proper signals from both of the collision-detecting sensor and the arming sensor before permitting deployment of the airbag. Closing or opening a switch in such an airbag control module during the course of an airbag deployment operation may also produce a signal that can be used in parallel as either an informational signal 112 or a direct command signal 114. A stand-alone collision-detecting system having similar operational features may be incorporated in a hazard warning system.

Access to a signal that may be used for informational signal 112 or command signal 114 may be obtained by appropriately connecting a wire, or wires, to a switch portion of a collision detector, control module, or other source of such signal. An aftermarket hazard warning system (i.e., a system not integrated into a vehicle at the time of the vehicle's manufacture) may simply plug into an On-Board Diagnostic ("OBD") plug of a current or future industry standard. Of course, an OEM version of a hazard warning system 100 may be built-in to a new vehicle, and may include access to an appropriate sensor or control module within an OEM wiring harness. Alternatively, an aftermarket wire may be operably connected directly to a collision detector element or module of an OEM airbag deployment system. Communication between a detector 106 and either, or both of, a controller 104 or remote warning signal transmitter 108 may also be provided using a wireless transmission protocol, such as the open-source Class 3 Bluetooth protocol, which has a maximum permitted power of 1 mW and range of about 1 meter. In such case, inter-component transmission of a hazard warning system disposed in one vehicle may be less likely to be accidentally received by an adjacent vehicle.

One or more detectors 106, dedicated solely to the hazard warning system 100, may be used to provide one or more directionally based input signals 112, or command signals 114. Many collision detection sensors are substantially directional in their capability to detect collisions. For example, a rolling ball element will not be urged to travel up a tube's incline if an appropriate change in acceleration is not directed in sufficient agreement with the tube's axis. Some air bags are designed to prevent the vehicle's occupants' heads from hitting the dashboard. Therefore, most collision sensors for air bags are oriented in agreement with a length axis of the vehicle. A plurality of collision sensors carried independently from the vehicle airbag deployment system may permit deployment of a remote warning signal responsive to a side-impact collision, or even a rear-impact collision, collisions which may not cause an air bag to deploy. A plurality of independent collision sensors may be carried in an aftermarket collision warning module to provide a plurality of directionally based input signals 112 or command signals 114. In some embodiments, a detector 106 may be configured to detect collisions from any direction of the compass. For example, a detector 106 may include an accelerometer capable of detecting changes in velocity in two or more directions, such as changes in velocity in 3-dimensional space, and/or changes in rotational velocity.

One or more independent sensors may be used in combination with a collision sensing element of a vehicle's airbag deployment system. For example, one or more independent collision sensors may be carried in an aftermarket collision warning module disposable in communication with an OEM airbag deployment element to provide a plurality of directionally based input signals 112 or command signals 114. Such an independent sensor may be configured to detect a side-impact collision, and/or a rear impact collision, for example.

A controller 104 may include any suitable intervening device to actuate a transmitter 108 subsequent to detection of a collision involving the vehicle 170. In some cases, a controller 104 may be embodied as part of a detector 106. For example, a wire may be arranged directly to convey an input, such as the presence or absence of an electrical signal, from a collision detector to a transmitter and thereby cause broadcast of a remote warning signal. In some embodiments, a controller 104 may include a structure capable of at least rudimentary decision making, such as a programmable logic controller ("PLC"), a microprocessor, or the like. A controller 104 may include a microprocessing element conventionally carried by a vehicle, such as a processing element used for emissions control or operation and/or monitoring of some other vehicular system.

A controller 104 may be structured and arranged to receive and evaluate one or more input, such as input 112 from detector 106, before making an actuating output or command signal 114 to cause operation of a remote signal transmission device 108. For example, controller 104 may receive an informational signal 112 from a detector 106, evaluate the signal 112 compared to a pre-programmed range of responses, and make a corresponding output signal 114, causing broadcast of an RF warning signal 116 from RF transmitter 109.

A hazard warning system 100 may also include a receiver, generally indicated at 120, to receive a remote warning signal transmitted from a different hazard warning system carried in a different vehicle. For example, receiver 120 may include an RF antenna 121 structured to receive an RF signal 116' that is transmitted by the other vehicle. After receiving the signal 116', receiver 120 may pass its output 122 as an informational input 122 to controller 104. Consequently, controller 104 may make a command output 124 to cause operation of a local warning device, generally indicated at 126. A local warning device 126 may communicate a warning to the operator of the vehicle in which a hazard warning system 100 is installed. A local warning device 126 may include a visual display device 128 on which text characters may be shown to communicate a message to an occupant of the vehicle in which a hazard warning system 100 is carried. Alternative local warning devices may nonexclusively include audible and other visually perceptible systems.

Components of the hazard warning system 100 may be configured to automatically begin operation when a vehicle in which the system 100 is disposed is in operation. The transmitter 108 may continue operating after the vehicle ceases operation. For example, when a vehicle stops due to a collision, the transmitter 108 may continue to operate to warn other vehicle operators. The local warning device 126 may be configured to begin operation when a vehicle in which the system 100 is started, such that the vehicle's operator need not remember to enable the local warning device 126 each time the vehicle is operated. The system 100, or portions thereof, may be configured such that a vehicle operator may not disable the system 100.

A hazard warning system 100 may include an additional apparatus, generally indicated at 130, to cause an input 132 for evaluation by the controller 104. For example, a user override control, such as a switch 134, may be actuated by a vehicle operator to turn off or otherwise adjust a signal 116. In some cases, the controller may be provided with programming instructions to enable such override only after a selected period of time has elapsed subsequent to activation of the warning system 100. Apparatus 130 may be structured to permit a vehicle operator to transmit a text message to other operators, to specific selected receivers (e.g., via cellular telephone transmission to selected telephone numbers), or to authorities. Apparatus 130 may also be configured to permit a vehicle operator to transmit a warning to systems in other vehicles, such as when the operator detects that the vehicle has a flat tire, is running out of fuel, is hydroplaning, is stuck in snow, or is otherwise a hazard to other vehicles. Furthermore, a vehicle operator may activate the apparatus 130 upon observing a hazard, such as a collision, a disabled vehicle, debris in a roadway (e.g., dropped cargo, fallen trees or rocks), wildlife, roadkill, an emergency vehicle; emergency or traffic control personnel, a pedestrian, a slippery road surface, a work crew, etc. Thus, the system 100 may be operable to generate a signal 116 based only on the input of a vehicle operator, which signal 116 may warn operators of nearby vehicles of a hazard.

In some embodiments, the hazard warning system 100 may detect an event (e.g., a sudden deceleration), but may be unable to determine if the event warrants transmitting a warning signal 116 to systems in other vehicles. For example, a deceleration above a selected threshold may automatically cause a warning signal 116, whereas a deceleration below that threshold may not. After such an event, the local warning device 126 may prompt the vehicle operator regarding the transmission of a warning signal 116. The operator may then direct the system 100, such as via apparatus 130, to transmit a warning signal 116 or to not transmit a warning signal 116.

In some embodiments, the system 100 may inform specific people or organizations of a collision. For example, a system 100 may include cellular or radio communication modules (e.g., cellular telephones and associated equipment), and may send text or voice messages to family members, friends, emergency personnel, etc. Messages may include a location, information about the collision (e.g., speed of the vehicle, direction of travel, etc.), and/or any other information.

Figure 2:
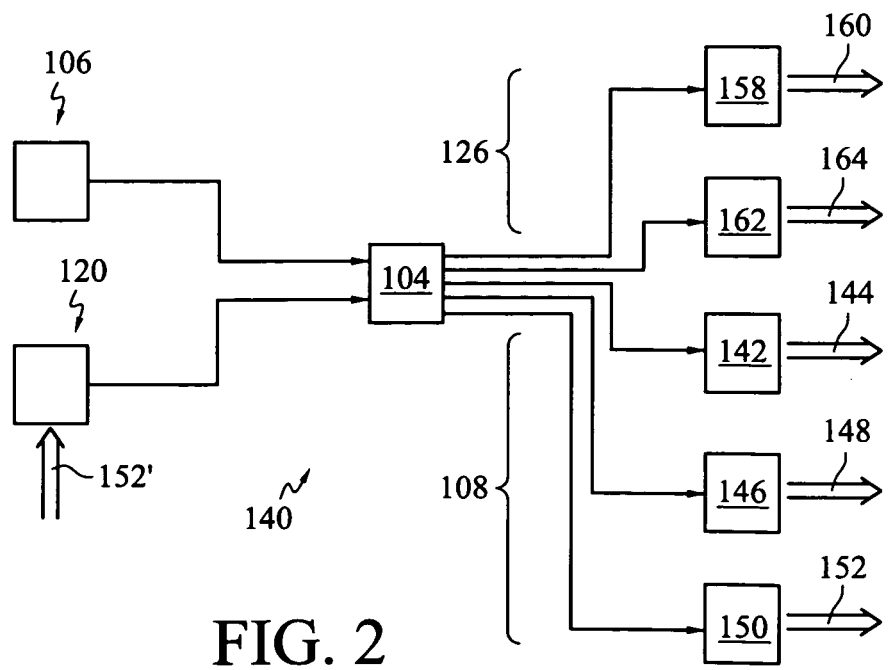
FIG. 2 is a simplified schematic illustrating certain operable relationships between elements that may be included in an operable embodiment.

With reference now to FIG. 2, a second embodiment, generally indicated at 140, includes a detector 106 in communication through a controller 104 to operate a remote warning signal transmitter 108. As illustrated, a remote warning signal transmitter 108 may be embodied as one or more of: an alarm 142 operable to transmit a loud sonic signal 144 that is audibly perceptible to approaching traffic (e.g., a siren); a warning light 146 operable to transmit a warning signal 148 that is visibly perceptible to approaching traffic (e.g., a flashing light); and a transmitter 150 operable to transmit a remote warning signal 152 that may be received by a signal receiving apparatus 120 carried in an approaching vehicle.

Embodiment 140 also includes a receiver 120 in communication through controller 104 to operate a local warning device 126. A local warning device 126 may include one or more of: a local display element 158 configured to transmit a local signal 160 that is visibly perceptible to an occupant of the vehicle; and a speaker 162 configured to produce a local sound output 164 that is audible to the occupant. Display elements 158 may include, for example, LED and LCD display panels, one or more light that can emit individually distinguishable colors, an array of lights, a bar graph, a meter with a rotating needle, and the like. An audible signal 164 may be used in combination with a visual signal 160 to increase the likelihood that the operator of the vehicle will notice and heed the warning. The audible signal 164 and/or the visual signal 160 may be configured to be different from other signals conveyed to the vehicle operator (e.g., a low-fuel light, an emissions-control system light, etc.). Vehicle operators may be more likely to notice a sound and/or light that is abnormal in relation to typical vehicle operation. Since a nearby hazard has the potential for immediate and catastrophic harm, it may be advantageous to draw the attention of a vehicle operator immediately to a warning of such a hazard. One or both of audible signal 164 and visible signal 160 may be configured to change in intensity (e.g. change in decibel level, color, amount of needle rotation, or bar length) responsive to a distance between the receiver 120 and a hazard site.

Figure 3:
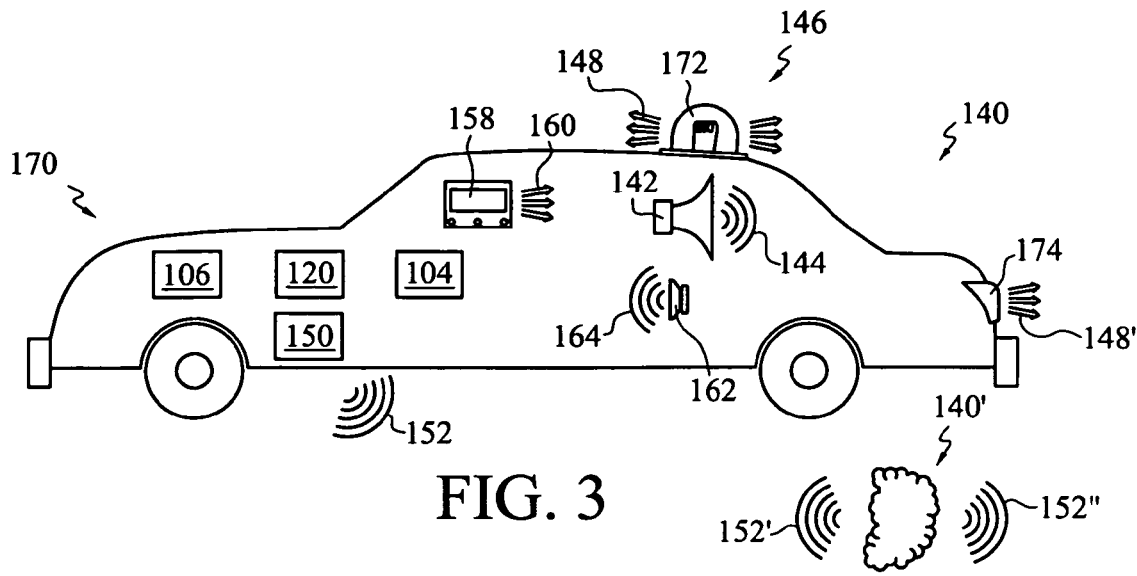
FIG. 3 is a simplified schematic view in elevation representing an assembly constructed according to certain principles of the instant disclosure.

As illustrated in FIG. 3, a hazard warning system, such as embodiment 140, may be adapted to be carried in or on an automotive vehicle, generally 170. In general, such automotive vehicle 170 may encompass cars, trucks, motorcycles, heavy transport vehicles, delivery vehicles, and the like. Similar systems may be adapted for use in or on any type of vehicle, such as boats, bicycles, construction equipment, commercial semis, trains, race cars, etc. Certain hazard warning systems may include OEM assemblies built-in to particular vehicles.

Other hazard warning systems may be substantially modular components or assemblies that can be connected, as appropriate, to one or more elements carried by a vehicle. Preferably, one such element is associated with the airbag deployment system of the vehicle. Certain hazard warning systems may include modular stand-alone systems that can easily be transferred between vehicles.

In some embodiments, a hazard warning system may incorporate a cellular telephone (e.g., an Apple IPHONE®, an ANDROID™ phone, a WINDOWS PHONE™, etc.), and may be configured to employ one or more sensors built in to the cellular telephone (e.g., a microphone, an accelerometer, a global positioning system (GPS) receiver, etc.). Such a hazard warning system may operate as a software application or "App" on the phone. A hazard warning system operating as a software application on a cellular telephone may include logic to differentiate a vehicle collision from other changes in velocity, such as a dropped phone, etc. A hazard warning system including a cellular telephone may be configured to communicate with hazard warning systems integrated or installed in vehicles.

With continued reference to FIG. 3, automotive vehicle 170 carries a controller 104 in communication with a detector 106 and a remote warning signal transmitter 150. When vehicle 170 is involved in a detectable collision, warning signal transmitter 150 broadcasts a remote warning signal 152 to operators of other vehicles in the local area of the collision. Additionally, alarm 142 may broadcast a remotely audible warning signal 144. An alarm 142 may include the vehicle's conventional horn, although a special purpose noise maker or siren may be used alternatively, or in addition to the vehicle's horn.

Further, warning light 146 may broadcast a remote warning signal 148 that can be perceived by operators of approaching vehicles. In certain embodiments, the device used to broadcast light signal 148 may be structured to permit observation of the signal 148 from all angles of approach to the broadcasting vehicle. One such device includes roof-mounted beacon 172. However, one or more vehicle lights 174 already carried by vehicle 170, such as a headlight, turn signal, taillight, running light, fog light, and/or brake signal, may be used as a broadcasting element for a visible signal 148'. The beacon 172 or vehicle lights 174 may be integrated into the vehicle 170 such that the vehicle 170 retains its styling and/or aesthetic appeal.

Warning signals 144 and warning lights 146 may also alert others of a collision, even when there is no immediate hazard to other vehicles. For example, a vehicle equipped with a hazard warning system may leave a roadway, such as into a ditch or ravine, and may be disabled. Since it is out of the flow of traffic, the vehicle may not be a hazard to other vehicles. The operator, however, may be hurt, unconscious, or in danger, and may need assistance. Operators of other vehicles may be unaware of the existence of the disabled vehicle, but for the warning signal 144 and/or warning light 146. Upon seeing the warning light 146 and/or hearing the warning signal 144, an operator of another vehicle may call emergency personnel for help and/or render assistance. In some circumstances, an operator of a disabled vehicle may use the light from the warning light 146 to find a path through an otherwise dark area to seek assistance (e.g., back to a roadway).

Embodiment 140 includes a receiver 120 in communication with controller 104 and adapted to receive a signal 152' that is transmitted by a second embodiment 140' carried in another vehicle in proximity to vehicle 170. When signal 152' is forwarded by receiver 120 as an information signal that is received and interpreted by controller 104, a controller 104 may cause a display 158 to emit an appropriate visible signal 160. Controller 104 may optionally cause speaker 162 to emit an appropriate audible alert 164. One or more speakers present in an audio system (e.g., an audio entertainment system) of vehicle 170 may be used as speaker 162. Alternatively, a hazard warning system may include a dedicated speaker.

A transmitted remote warning signal 152 may be scalable in transmission power to effect a desired distance of signal transmission appropriate to the local operation of a vehicle 170 (e.g., city, mountain, country, etc.) Some transmitters of remote warning signals 150 have a fixed transmission range. Transmitters may include low-power RF transmitters or low-power radar transmitters, such as those deployed in certain automobile parking radar systems. An embodiment 140' may be adapted to receive signal 152 from embodiment 140, and embodiment 140' may subsequently rebroadcast such signal as retransmitted signal 152". In such an arrangement, the remote warning signal may be transmitted a greater distance, and provide additional time for an operator of an approaching vehicle to prepare to arrive at the hazard site. Of course, a feedback signal may be included in such an arrangement, to prevent the signal 152 from being re-broadcast beyond a range useful to others. For example, it may not be beneficial to warn motorists that a collision has occurred 80 km away, or to warn motorists travelling in a parallel direction but offset in a direction transverse to a direction of travel toward the hazard site (e.g., on a parallel street). Such extreme range warning may not be helpful to a person receiving a signal rebroadcast multiple times.

Figure 4:
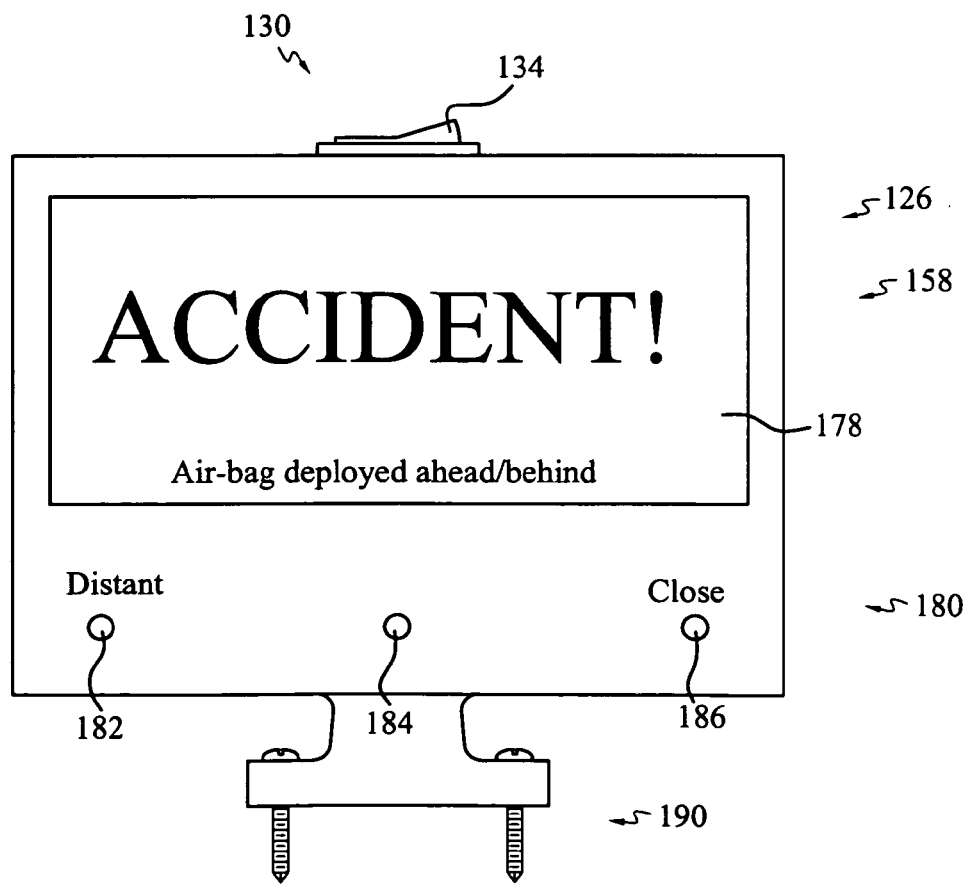
FIG. 4 is a simplified front view in elevation of a workable display device operable in certain embodiments of the invention.

In some embodiments, a hazard warning system 140 may be configured such that a signal 152' may not be rebroadcast automatically as signal 152. Instead, an operator of a vehicle in which system 140 is disposed may be prompted to rebroadcast the signal 152' to other vehicles as signal 152. The system 140 may indicate to the operator of the vehicle the number of times the signal 152' has been transmitted previously. In some embodiments, the hazard warning system 140 may be configured to automatically determine whether to rebroadcast a signal 152'. Such determination may be based in whole or in part upon the number of times the signal 152' has been transmitted, the distance to the original source of the signal 152', the speed and direction of travel of the vehicle carrying the system 140, the presence or absence of nearby roads, etc. A local display device 158 is illustrated in FIG. 4. Display device 158 may include a display panel 178 on which a text message and/or one or more indicator element may be indicated. The panel 178 may be configured to convey an appropriate text message to the operator of a vehicle in which the local display device 158 is carried. Messages may include simple warnings, such as "ACCIDENT!", "COLLISION AHEAD!", "CAUTION", "DISABLED VEHICLE!", "HAZARD!", or "WARNING!". The text may be displayed in manner or color to attract the attention of the vehicle's driver. Certain embodiments of display panel 178 may indicate more complicated messages. For one example, a receiver 120 may receive a signal that is broadcast from a traffic sign, and subsequently display a more complete message than can be perceived by a driver during a short interval during which such traffic sign is visible and decipherable. The driver may then review the message in more depth after passing the sign.

In some embodiments, details about the hazard location may be included, such as that the hazard is ahead of, or behind, the present vehicle. A display, generally indicated at 180, may indicate intensity of an attribute associated with a signal, such as distance to a hazard site. Intensity display 180 illustrated in FIG. 4 includes a yellow light emitting element 182, an orange light emitting element 184, and a red light emitting element 186. In such an arrangement, yellow element 182 may be enabled to indicate a distant hazard. Similarly, orange element 184 and red element 186 may individually be illuminated in appropriate sequence as the display 180 approaches the hazard location. An alternative intensity display may be presented on a multipixel screen, such as a CRT, LCD, or LED screen, which can illustrate such parameter graphically, and in various forms such as: a pie chart, a bar chart, and a picture of an analog dial with a rotating needle, etc.

A speaker 162 may emit a variable warning sound that may vary in pitch; volume, etc., to indicate intensity levels of a parameter, such as distance to the hazard site. For example, a prerecorded voice may announce the distance to the hazard site. A modular embodiment of a system 140 including a local warning device 126 may include a display element 158 and a speaker 162.

FIG. 4 also illustrates an additional input apparatus 130 that is embodied as a toggle switch 134. Such switch 134 may be employed as an on-off switch, and/or as an override control effective to terminate the output of one of more warning signal. Another alternative input apparatus 130 may include a device (e.g. keyboard or keypad, not illustrated) adapted to permit a vehicle occupant to input a text message for transmission by a transmitting element 108.

Provision may be made to anchor a local display 126 or 158 with respect to a vehicle in which such local display is carried. Anchoring means, generally indicated at 190, are therefore generally included. Anchoring means 190 may include screws, as illustrated, or various adhesive arrangements; including decoupling arrangements, such as hook and loop fasteners, which permit transport of a system 126 between different vehicles; friction mounting arrangements, suction-cup mounting arrangements, and other anchoring arrangements generally known in the art.

Certain embodiments may be incorporated in OEM installed systems, and may even be integrated into or available as an add-on for certain devices, such as commercially available media-playing systems, GPS receivers, cellular telephones, etc., devices that may be carried in or installed in vehicles.

A hazard warning system incorporating a GPS receiver or another location-sensing device (e.g., a device such as a cell phone that uses cell phone tower triangulation to determine location) may, for example, transmit information about the location of a hazard. For example, if a vehicle operator observes a hazard, the operator may activate a warning to systems in other vehicles. The warning may include an approximate location of the hazard and/or the time the hazard was observed. In some embodiments, the warning may be passively initiated by the hazard warning system without human intervention, and may nonetheless include information about the location and/or time of the hazard. In some embodiments, a hazard warning system may filter warnings by location and time to avoid unnecessarily distracting a vehicle operator with information about hazards outside the vehicle's path.

A hazard warning system may include a voice-recognition system. For example, upon observing a hazard, a vehicle operator may activate the hazard warning system, and may then orally report the nature of the hazard (e.g., "debris in the center lane"). The voice-recognition system may convert the spoken words of the vehicle operator to text, and may transmit the text (e.g., via Short Message Service (SMS) or Multimedia Messaging Service (MMS), etc.) to other hazard warning systems. Hazard warning systems in nearby vehicles may convert the text into computer-synthesized speech for aural reception by vehicle operators, as is known in the field of GPS-based navigation. Such a system may afford a wide variety of warnings for hazards not contemplated in advance, and may provide more detail about such hazards. In other embodiments, an audio recording of the operator who observes the hazard may be transmitted to and replayed by hazard warning systems in nearby vehicles.

In some embodiments, a hazard warning system may allow operators of later-arriving vehicles at the scene of the hazard to update information regarding the hazard. For example, a hazard warning system may alert an operator of a first vehicle that other vehicle operators noted a hazard near the current location of the first vehicle. The operator of the first vehicle may then confirm the hazard, such as through, for example, voice confirmation, a switch, a keypad, a keyboard, or a touch-screen. The operator may alternatively indicate that the hazard is no longer present. After a specified number of vehicle operators indicate that the hazard is no longer present (e.g., after indications from one operator, two operators, three operators, etc.), hazard warning systems may stop transmitting warnings of such a hazard.

Hazard warning systems hereof may supplement and/or interact with anti-collision systems or pre-collision systems available in some automobiles (e.g., systems that use radar to detect when a vehicle is at risk of collision, systems that pre-charge brakes before a predicted collision, systems that apply brakes to slow a vehicle before a predicted collision, or systems that tighten safety belts before a predicted collision). For example, a hazard warning system hereof may be configured to receive a signal from a pre-collision system indicating that a collision is imminent. The hazard warning system may transmit a warning of the impending collision to other vehicles before the collision occurs. This may provide an additional period of time for operators of other vehicles to react, and may therefore prevent some vehicles from joining the collision that may otherwise join the collision if the warning signal were first sent after the collision had begun. For example, such early warnings may keep a two-vehicle collision from becoming a collision involving three, four, or more vehicles.

Hazard warning systems as disclosed herein may also be configured to receive signals from other compatible systems. For example, a pedestrian, road or utility worker, or bicyclist may carry a transmitter to transmit signals detectable by hazard warning systems. Such a transmitter may operate as a software application on a cellular telephone. Operators of nearby vehicles may thus receive an advance warning of the presence of such individuals.

Figure 5:
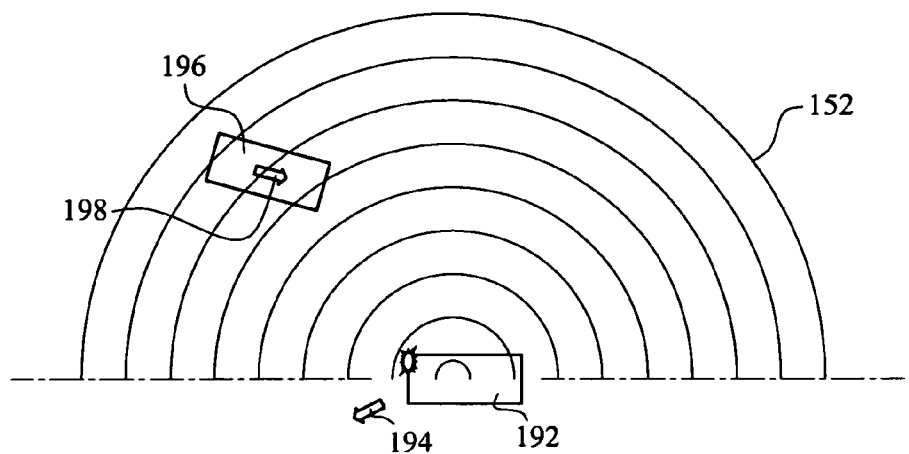
FIG. 5 is a first plan view of motor vehicles carrying embodiments of the invention.
Figure 6:
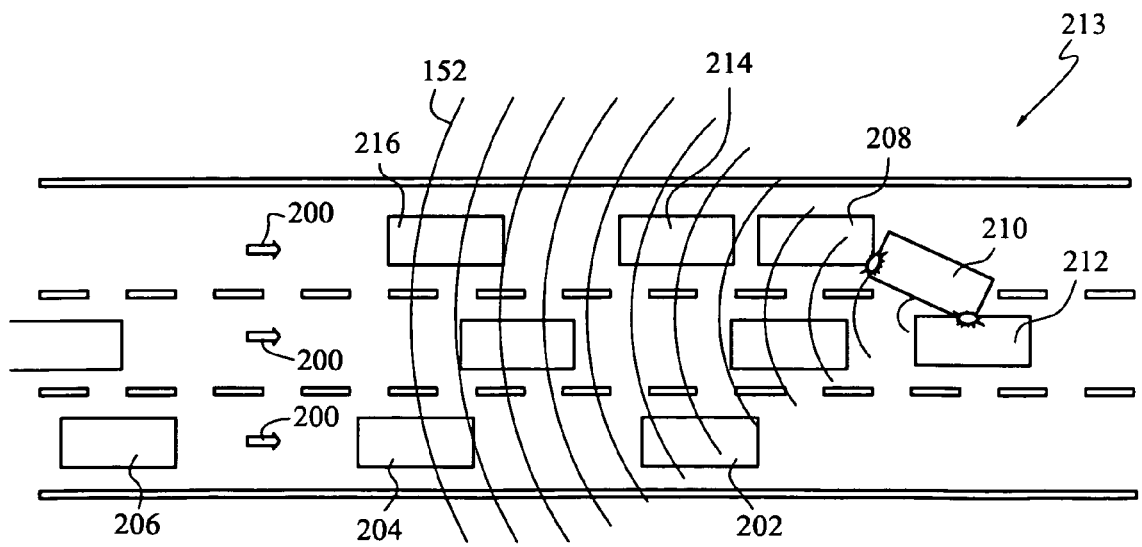
FIG. 6 is a second plan view of motor vehicles carrying embodiments of the invention.

FIGS. 5 and 6 illustrate two traffic situations in which embodiments of hazard warning systems can be effective to provide an increment of advance warning of a collision, and additional time in which an operator of a vehicle may take evasive action. In FIG. 5, the original direction of travel for vehicle 192 is indicated by arrow 194, and the direction of travel for vehicle 196 is indicated by arrow 198. Vehicle 192 is illustrated as having hit an obstruction that caused airbag deployment. As a consequence of the airbag deployment, a hazard warning system carried in vehicle 192 also broadcast a remote warning signal 152 to all cooperating vehicles within broadcast reach. Therefore, the operator of vehicle 196 is forewarned, and may employ a suitable amount of caution in the vicinity of the collision. Note that for efficiency of space utilization on the sheet, only one-half of the symmetrical broadcast signal 152 is illustrated. Because the resting orientation of a vehicle subsequent to a collision is indeterminate, a broadcast signal, such as signal 152, may be broadcast in all directions of the compass.

FIG. 6 illustrates a traffic situation in which the direction of traffic motion is indicated by arrows 200. Vehicles 202, 204, and 206 are spaced apart by about the minimum safe distance for operation at the speed of the illustrated traffic. Vehicles 208, 210, and 212 have just become involved in a collision, generally 213, and an airbag was deployed in at least vehicle 210, which caused broadcast of remote warning signal 152. While vehicle 214 may not be able to stop in time to avoid joining the collision 213, the operator of vehicle 216 may receive warning signal 152 and gain an additional increment of time sufficient to avoid the collision 213.

Once a collision happens, a hazard warning system, such as hazard warning system 100, may be structured to transmit a remote warning signal 152 for a mandatory period of time to ensure approaching vehicles are sufficiently warned. For example, such mandatory period of time may be about 2 minutes. The operator of the transmitting vehicle may then be able to stop the signal if the operator determines that there is no further hazard. For example, a hazard warning system may be interrupted by pressing a "reset" button, or an on/off button associated with a local display screen inside the crashed vehicle. If the operator is unconscious or unable to push the reset button, the signal 152 may continue broadcasting until another person interferes.

What is claimed is:

1. A system comprising:
   a first detector structured to be carried onboard a first vehicle and adapted to detect a first hazard and to consequently cause a first output therefrom;
   a first transmitter in communication with the first detector and operable to broadcast a first remote warning signal therefrom subsequent to receiving the first output;
   a first receiver structured to be carried onboard the first vehicle and operable to receive an external remote warning signal transmitted by another transmitter; and
   a first local warning device in operable communication with the first receiver and configured to provide a warning to an occupant of the first vehicle, the warning corresponding to receipt of the external remote warning signal, the first local warning device comprising a display device in communication with the first receiver, wherein:
   the display device is structured to visually convey an estimate of the distance to a location of an external hazard associated with the external remote warning signal;
   each of a plurality of audible noises is individually assigned to one of a plurality of discrete distance estimates;
   a speaker is operably associated with the system to broadcast the noise corresponding to the estimate of the distance; and
   an override control operable to terminate broadcast of the first remote warning signal, wherein the override control is structured to be operable only after a pre-programmed period of time has elapsed subsequent to first broadcast of the first remote warning 2. The system of claim 1, further comprising:
   a second detector structured to be carried onboard a second vehicle and adapted to detect a second hazard and to consequently cause a second output;
   a second transmitter in communication with the second detector and operable to broadcast a second remote warning signal subsequent to receiving the second output;
   a second receiver structured to be carried onboard the second vehicle and operable to receive at least one of the first remote warning signal and the external remote warning signal; and
   a second local warning device in communication with the second receiver and configured to provide a warning to an occupant of the second vehicle, the warning corresponding to at least one of the first remote warning signal and the external remote warning signal.

3. The system of claim 1, wherein:
   the first detector is disposed in-circuit to receive an input from a component of airbag deployment circuitry of the first vehicle.

4. The system of claim 1, further comprising:
   a warning light structured to be carried onboard the first vehicle, the warning light adapted to broadcast a warning light output configured to be visible to an occupant of an approaching vehicle, responsive to the first output.

5. The system of claim 4, wherein the warning light is adapted to be carried on top of a roof of the first vehicle.

6. The system of claim 4, wherein the warning light comprises a light selected from the group consisting of a brake light, a turn signal light, a taillight, a running light, a fog light, and a headlight.

7. The system of claim 1, further comprising:
   an alarm structured to be carried onboard the first vehicle and adapted to broadcast an audible warning responsive to the first output.

8. The system of claim 1, wherein the first local warning device comprises a screen configured to display a printed message.

9. The system of claim 1, wherein the first local warning device is structured to visually convey the instantaneous intensity, selected from a range of intensity, of an attribute associated with at least one of the first remote warning signal and the external remote warning signal.

10. The system of claim 9, wherein:
    the first local warning device is structured to determine and visually convey an approximate current state of intensity, selected from a plurality of different states of intensity, of an attribute associated with at least one of the first remote warning signal and the external remote warning signal;
    each of a plurality of sounds is individually assigned to one of the states of intensity; and
    a speaker associated with the system is configured to broadcast at least one sound of the plurality and corresponding to the currently determined state.

11. The system of claim 10, wherein the first local warning device further comprises a screen configured to display a printed message responsive to at least one of the first remote warning signal and the external remote warning signal.

12. The system of claim 11, wherein the message is selected from a group of pre-programmed messages based upon a characteristic of at least one of the first remote warning signal and the external remote warning signal.

13. The system of claim 1, wherein a transmission range of the first remote warning signal is adjustable.

14. The system of claim 1, wherein the first transmitter is disposed in-circuit operably to rebroadcast the external remote warning signal.

15. The system of claim 1, wherein:
the first detector comprises a component of an airbag deployment control assembly configured to produce the first output in response to airbag deployment; and
the first local warning device and the second local warning device comprises a display device in communication with the first receiver.

16. The system of claim 1, wherein the first detector is adapted to detect a collision as the collision occurs.

17. The system of claim 1, wherein the first transmitter is configured to begin transmitting a signal upon activation by an operator of the first vehicle.

18. The system of claim 1, wherein the first local warning device is configured to operate whenever the first vehicle is in operation.

19. The system of claim 18, wherein the first local warning device is configured to continue to operate for a selected time period after operation of the first vehicle ceases.

20. The system of claim 1, wherein the first transmitter is configured to transmit a signal to a selected receiver.

21. The system of claim 1, wherein at least one of the first detector, the first transmitter, the first receiver, and the first local warning device comprises a cellular telephone.

22. The system of claim 1, further comprising a second transmitter operable to broadcast a second remote warning signal, wherein the second transmitter comprises a cellular telephone.

23. A method comprising providing a warning of a hazard via a warning system to at least one occupant of at least one vehicle not involved in the hazard, the warning system comprising:
a first detector structured to be carried onboard a first vehicle and adapted to detect a first hazard and to consequently cause a first output therefrom;
a first transmitter in communication with the first detector and operable to broadcast a first remote warning signal therefrom subsequent to receiving the first output;
a first receiver structured to be carried onboard the first vehicle and operable to receive an external remote warning signal transmitted by another transmitter; and
a first local warning device in operable communication with the first receiver and configured to provide a warning to an occupant of the first vehicle, the warning corresponding to receipt of the external remote warning signal, the first local warning device comprising a display device in communication with the first receiver, wherein:
the display device is structured to visually convey an estimate of the distance to a location of an external hazard associated with the external remote warning;
each of a plurality of audible noises is individually assigned to one of a plurality of discrete distance estimates; and
a speaker is operably associated with the system to broadcast the noise corresponding to the estimate of the distance; and
an override control operable to terminate broadcast of the first remote warning signal, wherein the override control is structured to be operable only after a pre-programmed period of time has elapsed subsequent to first broadcast of the first remote warning signal.

24. The method of claim 23, further comprising connecting at least one wire to a source of the first output.

25. The method of claim 24, wherein connecting at least one wire to a source of the first output comprises forming an electrical connection to a diagnostic plug of the first vehicle.

26. A method comprising:
outfitting at least one of a pedestrian, a road worker, a utility worker, and a bicyclist with a transmitter configured to transmit a warning signal;
outfitting a vehicle with a hazard warning system, the hazard warning system comprising:
a receiver structured to be carried onboard the vehicle and operable to receive the warning signal transmitted by the transmitter;
another transmitter in communication with the receiver and operable to broadcast another remote warning signal therefrom subsequent to receiving the warning signal; and
a local warning device in operable communication with the receiver and configured to provide a warning to an occupant of the vehicle, the warning corresponding to receipt of the warning signal, the local warning device comprising a display device in communication with the receiver, wherein:
the display device is structured to visually convey an estimate of the distance to a location of the at least one of a pedestrian, a road worker, a utility worker, and a bicyclist associated with the warning signal;
each of a plurality of audible noises is individually assigned to one of a plurality of discrete distance estimates;
a speaker is operably associated with the system to broadcast the noise corresponding to the estimate of the distance; and
an override control operable to terminate broadcast of the another remote warning signal, wherein the override control is structured to be operable only after a pre-programmed period of time has elapsed subsequent to first broadcast of the another remote warning signal.

* * * * *